United States Patent [19]

Lindsley

[11] Patent Number: 5,063,373
[45] Date of Patent: Nov. 5, 1991

[54] FISHING ROD HOLDER WITH FISH ALERT

[76] Inventor: George R. Lindsley, 632 Calle Zapata, Tucson, Ariz. 85745

[21] Appl. No.: 603,156

[22] Filed: Oct. 25, 1990

[51] Int. Cl.[5] .................. G08B 23/00; A01K 85/01
[52] U.S. Cl. .................................. 340/573; 43/17
[58] Field of Search .............. 340/573, 668; 43/17; 200/61.85, 332, 335, 573

[56] References Cited

U.S. PATENT DOCUMENTS

| | | |
|---|---|---|
| 3,670,443 | 6/1972 | Federline ............... 43/17 |
| 3,835,462 | 9/1974 | Periman ............... 340/573 |
| 4,240,221 | 12/1980 | Komarnicki ............... 43/17 |
| 4,384,425 | 5/1983 | Lemons, Sr. ............... 43/17 |
| 4,399,630 | 8/1983 | Lawes ............... 43/17 |
| 4,479,321 | 10/1984 | Welstead ............... 43/17 |
| 4,523,403 | 6/1985 | Ivy et al. ............... 43/17 |
| 4,590,701 | 5/1986 | Rivers ............... 43/17 |
| 4,731,946 | 3/1988 | Blythe et al. ............... 43/17 |
| 4,766,688 | 8/1988 | Hiles ............... 43/17 |
| 4,930,243 | 6/1990 | Lowe et al. ............... 43/17 |

OTHER PUBLICATIONS

1990 Bass Pro Shops Catalog No. F004, Item No. 489-072, p. 262.

Primary Examiner—Glen R. Swann, III
Assistant Examiner—Thomas J. Mullen, Jr.
Attorney, Agent, or Firm—Antonio R. Durando; Harry M. Weiss

[57] ABSTRACT

A fishing rod holder that incorporates a sensing device to monitor the tension on the fishing line. When the tension increases, this device triggers either a sound or a visual alarm, according to the chosen operational mode, and alerts the fisherman as soon as a first strike occurs. The holder features a pointed tip for easy penetration and a foot rest for applying downward pressure while inserting it into the ground. Its construction consists of a sturdy main frame and a detachable alarm unit for durability and convenience of transportation. When assembled, the alarm unit can be adjusted to vary its position with respect to the rod and its sensitivity to tension in the line.

16 Claims, 1 Drawing Sheet

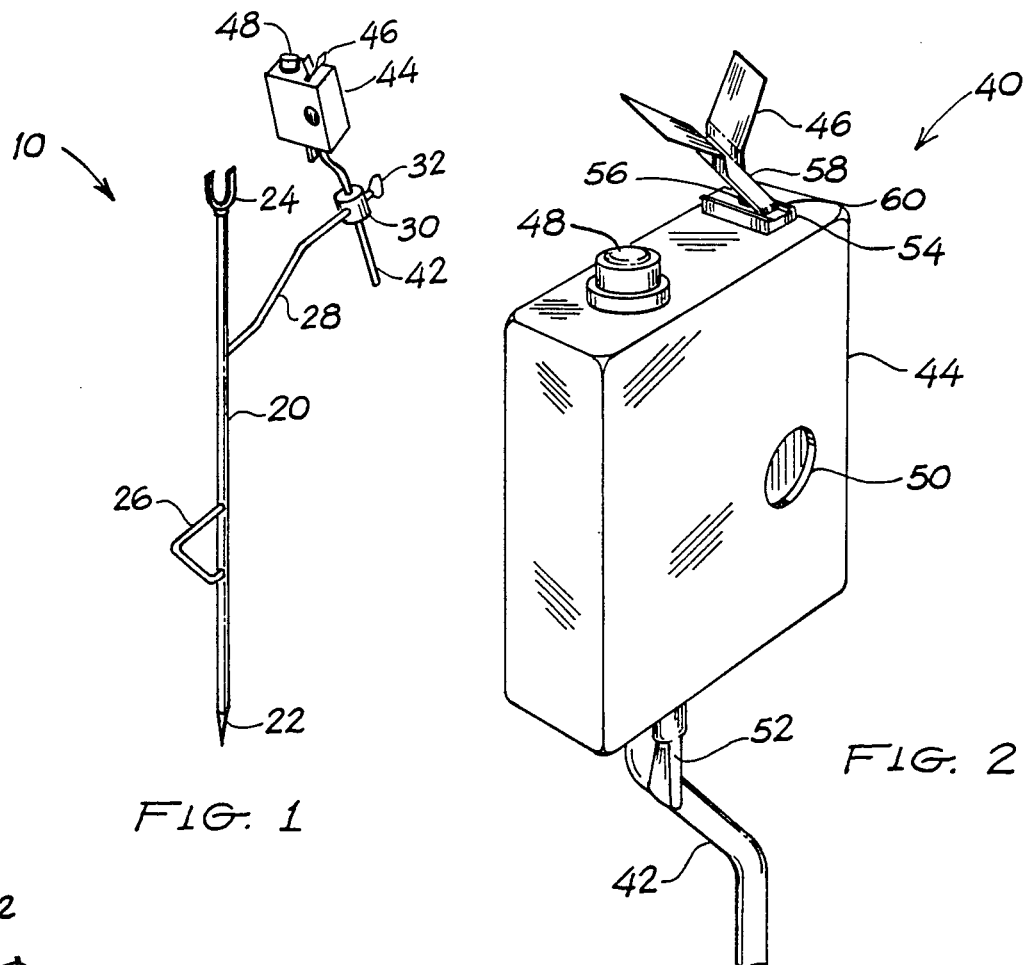
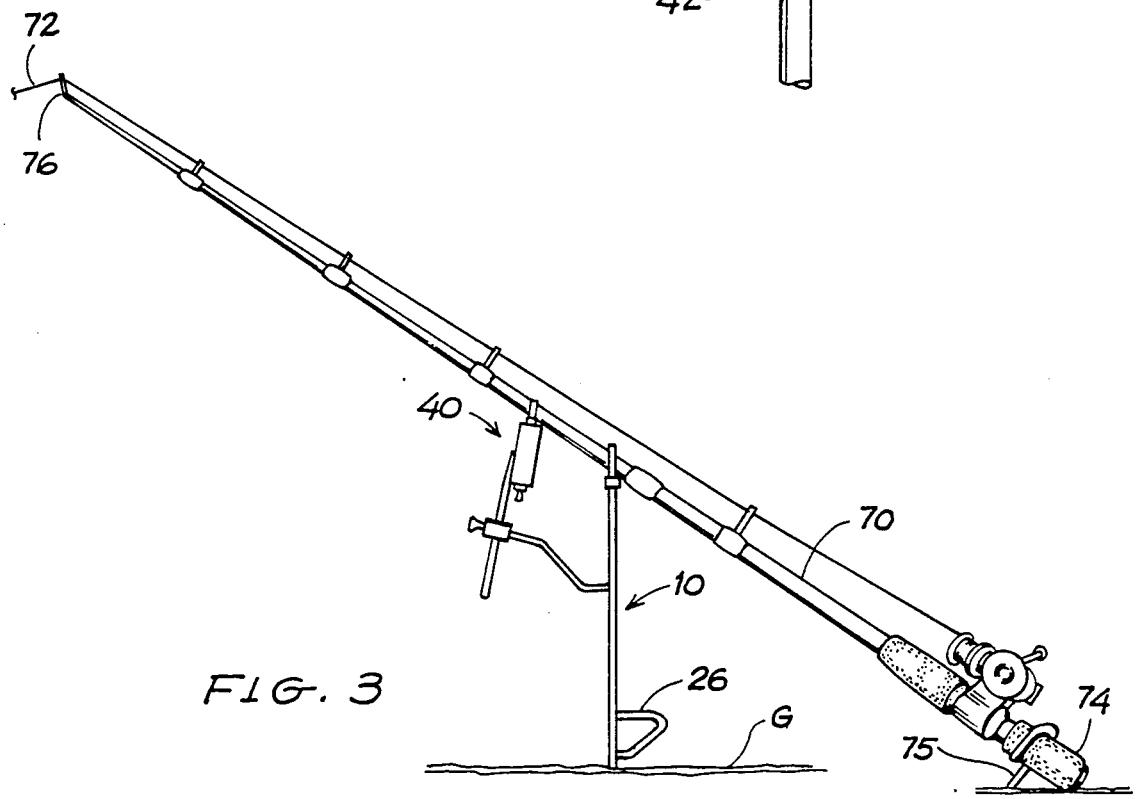

FISHING ROD HOLDER WITH FISH ALERT

SUMMARY OF THE INVENTION

1. Field of the Invention

This invention is related in general to the fields of support stands for fishing gear and of automatic alarms. In particular, the invention provides a new fishing rod holder that incorporates an alarm to alert the fisherman of any event that produces tension on the fishing line.

2. Description of the Prior Art

For centuries people have been catching fish by fastening some sort of hook with a bait to the end of a line attached to a pole. Probably for just as long a time, anglers have also looked for ways to free themselves from the task of holding the pole while waiting for a strike and have devised different methods to achieve that goal. As frequently demonstrated by children fishing from a shoreline, the simplest technique to that end consists of leaning the pole over a boulder toward the water and laying another boulder over the handle to anchor it against the ground. While possibly not very stable, this contraption is based on the same mechanical principles that underlie more complex and sophisticated devices.

A variety of homemade fishing rod holders can be seen in use by fishermen around the world. They are all characterized by a solid stand to support the blade of the rod in an elevated position while its handle rests on the ground or on the stand itself. Thus, the fisherman can cast the line, leave the rod on the stand, and then wait for the fish to bite while occupied in other endeavors. Obviously, particular attention must be paid to the tension of the line in order to insure a prompt response in case of a bite.

Since this necessity for constant monitoring of the line largely defeats the purpose of these devices, there exists a need for a more advanced rod holder that incorporates a means for detecting an increase in the line tension and for alerting the fisherman. A similar device is illustrated in Bass Pro Shops 1990 Catalog No. F004, consisting of an alarm attached to the rod itself to monitor the tension of the line. This apparatus does not relieve the fisherman, though, from the task of holding the rod. The present invention is directed to the combined solution of these specific problems.

BRIEF SUMMARY OF THE INVENTION

One objective of this invention is the development of a fishing rod holder of sturdy construction that can be firmly implanted in the ground on a typical shoreline. This is obtained by providing a stand with a pointed tip and a foot rest for use in pushing it into the ground.

Another objective of the invention is a holder that is capable of supporting any standard size fishing rod under normal conditions. To that end, the holder described herein features a V-shaped cradle large enough to conveniently accommodate all common sizes of rods in a stable arrangement.

A further goal of the invention is to include an alarm to alert a user when a fish causes an increase in the tension of the line. Therefore, this rod holder features a side arm extending from the main body incorporating a sensor and alarm activated by a point of contact with the blade of the rod.

Yet another goal of the invention is an apparatus that can be used both during daylight and at night. Thus, the alarm system used with this rod holder includes a buzzer as well as a light mode.

A final objective is the easy and economical manufacture of the holder according to the above stated criteria. This is achieved by using commercially available components and materials, modified only to the extent necessary to fit the requirements of the invention.

Therefore, according to these and other objectives, the present invention describes a fishing rod holder incorporating a sensing device to monitor the tension on the fishing line. When the tension increases, this device triggers either a sound or a visual alarm, according to the chosen operational mode, and alerts the fisherman as soon as a first strike occurs. The holder features a pointed tip for easy penetration and a foot rest for applying downward pressure while inserting it into the ground. Its construction consists of a sturdy main frame and a detachable alarm unit for durability and convenience of transportation. When assembled, the alarm unit can be adjusted to vary its position with respect to the rod and its sensitivity to tension in the line.

Various other purposes and advantages of the invention will become clear from its description in the specifications that follow and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

BRIEF DESCRIPTION OF THE DRAWINGS

FIG. 1 is a perspective view of the fish-alert rod holder of this invention.

FIG. 2 is a more detailed prospective view of the alarm unit incorporated in the rod holder shown in FIG. 1.

FIG. 3 is an illustration of the use of the rod holder of FIG. 1.

DETAILED DESCRIPTION OF THE INVENTION

This invention consists of the application of simple mechanical principles in combination with known electrical components to achieve a practical and economical design for a fishing rod holder with the properties described above. The main point of the invention lies in the recognition of the fact that the force exerted on the line of a fishing rod by a striking fish can be successfully utilized to trigger an alarm and alert a fisherman of the occurrence.

Referring now to the drawings, wherein like parts are designated throughout with like numerals and symbols, FIG. 1 illustrates in perspective view a fish-alert rod holder 10 according to the preferred embodiment of this invention. It consists of two separate components with distinct functions. The first component constitutes the support structure for the fishing rod and for the alarm unit, while the second component is the alarm unit itself. The main body of the support structure is a straight rod 20, approximately 35 inches long and either solid or of tubular construction, with a sharply pointed tip 22 at the bottom end. A foot rest 26, projecting out perpendicularly from the rod at a point approximately 14 inches from the tip 22, is provided to create a sturdy foothold by which the holder can be pushed into the ground. As shown in the figures, the foot rest is further anchored into the rod 20 at a point about 11 inches from the bottom, so that the rod can be inserted almost one foot deep and create a stable support for a fishing rod leaning against it. A V-shaped brace 24 at the top of the rod 20 constitutes the main point of support for the fishing rod, whose handle must also be resting on the ground in a secure position. The brace 24 is about one inch wide at the top and gradually decreases toward its bottom vertex to form a snug receptacle to receive and retain in place any standard size fishing rod resting on it. A side arm 28, projecting out and generally upward from the rod 20 in the direction opposite to the foot rest 26, supports a donut-shaped retainer 30 provided to house the elevator rod 42 of the alarm unit 40, which is shown in greater detail in FIG. 2.

The second distinct component of the invention is the alarm unit 40, which is housed in a protective box 44 attached to the elevator rod 42. It includes a sensing unit comprising a microswitch 54 activated by a spring-loaded trigger 56 which is in direct contact with a triggering lever 58. This lever is connected to the switch by a hinge 60 and rests on the trigger 56 without actuating it because its weight is not large enough to overcome the force of the spring in the trigger mechanism. At the tip of the lever, a cradle 46 constitutes the point of contact of the alarm unit with the blade of the fishing rod, as illustrated in FIG. 3. In an alternative embodiment of the invention (not shown in the figures), the cradle 46 is directly attached to the spring-loaded trigger 56, thus simplifying the design by eliminating the triggering lever 58 and its hinge 60. This configuration may also be structurally stronger and more suitable for heavier fishing rods. By sliding the elevator rod 42 up and down the retainer 30, the position of the alarm unit can be adjusted to variable levels of contact with and pressure against the rod so that the desired sensitivity is achieved. Obviously, as the alarm unit is adjusted upward, the cradle 46 pushes against the rod causing the lever 58 to engage and push down the trigger 56, which can thus be actuated by a progressively slighter pull on the fishing line.

When the normally open microswitch 54 is closed by the downward travel of the trigger 56, it connects a power supply (not shown in the figures) with either a buzzer 50 or a light 48, depending on the setting of the mode switch 52. The buzzer and the light are connected to the power supply in parallel and the switch 52 serves to alternatively direct the flow of electricity to either one of the two components. If desired, a three-way switch can be used to provide a third, "off" position. In the embodiment described herein, the power supply consists of two 1.5 volt batteries housed in the box 44 with a standard light bulb and buzzer, all of which constitute off-the-shelf components. Any combination of equivalent devices could easily be employed in obvious electrical arrangement by one skilled in the art. Looking at the use of the rod holder of this invention, FIG. 3 illustrates a fishing rod 70 after it has been leaned on the brace 24 of the holder 10 planted into the ground G of a shoreline. The tip 22 of the holder can be easily inserted into the ground by stepping on the foot rest 26 while holding the main rod just below the brace. It is recommended not to hold the alarm unit 40 while inserting the assembly into the ground in order to avoid the possibility of damage that might occur from exerting pressure on it. Although not essential, it is preferable to place the holder into the ground at a slight angle away from the water because this position increases the sensitivity of the alarm. After securing the rod holder in the ground, the fishing line 72 is cast as usual and the rod is laid on the holder 10 with the handle 74 on the ground facing the shore, so that the central portion of the rod and the line threaded along its length rest in both the brace 24 and the cradle 46, with the latter making slight contact with the forward portion of the rod. Correspondingly, of course, the tip 76 of the rod and the fishing line will be facing the water. In order to further secure the rod in position, a separate hook 75 may be provided to hold the handle 74 against the ground. This hook is forced into the ground over the handle in the same fashion as a tent stake.

If necessary, the height of the alarm unit can be adjusted by sliding the elevator rod 42 in the retainer 30 to insure contact with the fishing rod. A locking screw 32 is provided to lock the rod 42 in place after adjustment. As mentioned before, the sensitivity of the alarm can be increased by further elevating the cradle 46 to press against the rod 70 because a correspondingly smaller motion of the rod is thus required to trigger the microswitch and actuate the alarm. Finally, the mode switch 52 is used to select either the buzzer or the light mode to determine which alarm is triggered by increased tension in the line.

Once the fishing rod is in place, the fisherman no longer has to monitor the line for the first strike. When it occurs, the alarm alerts him so that he can promptly react and whip the line to set the hook on the fish according to standard angler techniques. No change is required to take advantage of the benefits of this rod holder. Obviously, both the buzzer and the light alarm can be used either during the day or at night, but the light mode is more useful at night because it also provides needed illumination of the area around the rod at the time of the catch.

While the embodiment of the invention shown in the figures features the specific shapes therein described, it can obviously take other shapes with equivalent functionality and utility. In fact, any shapes for the rod holder and the alarm that retain the functional characteristics described above provide an acceptable apparatus to practice the invention.

It has been found that steel is particularly suitable for the manufacture of the holder of this invention because of its strength, durability and resistance to exposure. Under certain conditions, it is also malleable and it can be easily formed and machined according to well known processes and procedures. Nevertheless, any other durable material would be equivalently adequate and acceptable to practice this invention.

Various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiment, it is recognized that departures can be made therefrom within the scope of the invention, which is therefore not to be limited to the details disclosed herein but is to be accorded the full scope of the claims so as to embrace any and all equivalent apparatus and methods.

What I claim as my invention is:

1. A fishing rod holder incorporating an alarm to alert a user of an increase in the tension of the fishing line, comprising:

(a) a support structure, consisting of a rod having a pointed bottom end for insertion into the ground and having a brace at its top end for receiving and supporting the blade of a fishing rod resting against said brace;

(b) sensor means, mounted on said support structure and adjustably in contact with the forward portion of said fishing rod, for sensing a pulling force on said forward portion of the fishing rod caused by a striking fish; and (c) alarm means, actuated by said sensor means, for alerting said user of the pulling force on said fishing rod;

wherein said support structure further comprises a foot rest, projecting out perpendicularly from said rod to create a foothold by which said holder can be pushed into the ground, and a side arm, projecting out and generally upward from said rod in the direction opposite to said foot rest to adjustably support said sensor means.

2. The holder described in claim 1, wherein said sensor means comprises a cradle attached to a lever hinged over and resting on the spring-loaded trigger of a normally open microswitch, said cradle constituting the point of contact of said sensor means with said fishing rod, and said microswitch being closed when sufficient downward force is exerted by striking fish on said forward portion of the fishing rod to overcome the resistance of said spring-loaded trigger.

3. The holder described in claim 2, wherein said alarm means consists of a battery operated light actuated by the closing of said normally open microswitch.

4. The holder described in claim 2, wherein said alarm means consists of a battery operated buzzer actuated by the closing of said normally open microswitch.

5. The holder described in claim 2, wherein said alarm means consists of a battery operated, dual mode alarm including alternatively a light and a buzzer, both actuated by the closing of said normally open microswitch, and a manual switch for selecting the alternative mode of operation.

6. The holder described in claim 5, wherein said brace consists of a V-shaped bracket about one inch wide at the top and gradually decreasing toward its bottom vertex to form a snug receptacle to receive and retain in place any standard size fishing rod resting on it.

7. The holder described in claim 6, further comprising a donut-shaped retainer, attached to the tip of said side arm, to slideably receive through its center opening an elevator rod rigidly connected to said sensor means, said elevator rod being fastened in place by a locking screw after adjustment to ensure physical contact between said cradle and said fishing rod.

8. The holder described in claim 7, wherein said support structure is approximately 35 inches long and said foot rest is anchored to said rod at two points approximately 14 and 11 inches from said pointed bottom end, so that said rod can be inserted almost one foot deep into the ground.

9. A method for freeing a fisherman from holding a fishing rod while waiting for a strike and contemporaneously being in a position to react promptly when such a strike occurs, comprising the following steps:

(a) providing a fishing rod holder incorporating an alarm to alert a fisherman of an increase in the tension of the fishing line, which holder includes: a support structure, consisting of a rod having a pointed bottom end for insertion into the ground and having a brace at its top end for receiving and supporting the blade of a fishing rod resting against said brace; sensor means, mounted on said support structure and adjustably in contact with the forward portion of said fishing rod, for sensing a pulling force on said forward portion of the fishing rod caused by a striking fish; alarm means, actuated by said sensor means, for alerting said user of the pulling force on said fishing rod; and wherein said support structure further comprises a foot rest, projecting out perpendicularly from said rod to create a foothold by which said rod can be pushed into the ground, and a side arm, projecting out and generally upward from said rod in the direction opposite to said foot rest to adjustably support said sensor means;

(b) inserting said pointed bottom end into the ground to place said support structure in a stable and generally vertical position;

(c) casting the fishing line and leaning said fishing rod on said brace at the top of said support structure with the fishing line facing the water, so that the forward portion of the rod makes slight contact with said sensor means while the central portion of said fishing rod rests in said brace; and (d) waiting for the actuation of said alarm means by the increase in the tension of said fishing line caused by a strike and responding according to usual angler techniques.

10. The method described in claim 9, wherein said sensor means comprise a cradle attached to a lever hinged over and resting on the spring-loaded trigger of a normally open microswitch, said cradle constituting the point of contact of said sensor means with said fishing rod, and said microswitch being closed when sufficient downward force is exerted by striking fish on said forward portion of the fishing rod to overcome the resistance of said spring-loaded trigger.

11. The method described in claim 10, wherein said alarm means consists of a battery operated light actuated by the closing of said normally open microswitch.

12. The method described in claim 10, wherein said alarm means consists of a battery operated buzzer actuated by the closing of said normally open microswitch.

13. The method described in claim 10, wherein said alarm means consists of a battery operated, dual mode alarm including alternatively a light and a buzzer, both actuated by the closing of said normally open microswitch, and a manual switch for selecting the alternative mode of operation.

14. The method described in claim 13, wherein said brace consists of a V-shaped bracket about one inch wide at the top and gradually decreasing toward its bottom vertex to form a snug receptacle to receive and retain in place any standard size fishing rod resting on it.

15. The method described in claim 14, further comprising a donut-shaped retainer, attached to the tip of said side arm, to slideably receive through its center opening an elevator rod rigidly connected to said sensor means, said elevator rod being fastened in place by a locking screw after adjustment to ensure physical contact between said cradle and said fishing rod.

16. The method described in claim 15, wherein said support structure is approximately 35 inches long and said foot rest is anchored to said rod at two points approximately 14 and 11 inches from said pointed bottom end, so that said rod can be inserted almost one foot deep into the ground.

* * * * *